May 21, 1935. H. M. A. STRAUSS 2,002,333
PORTABLE HOUSEHOLD MIXER AND JUICE EXTRACTOR
Filed Sept. 8, 1931  3 Sheets-Sheet 1
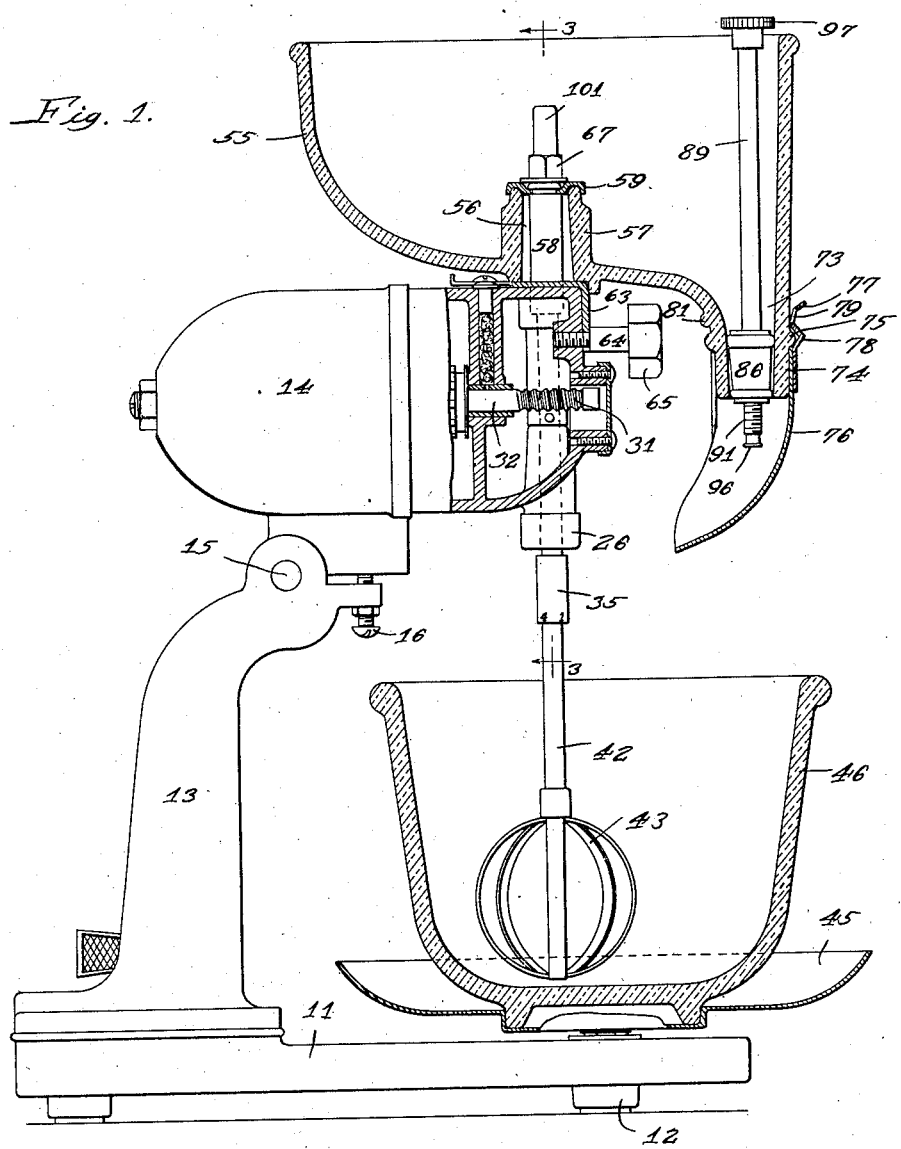
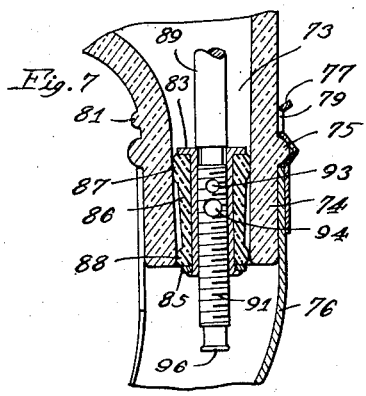
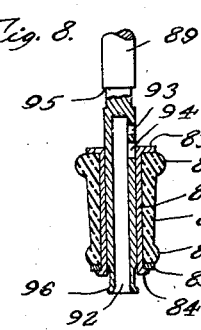

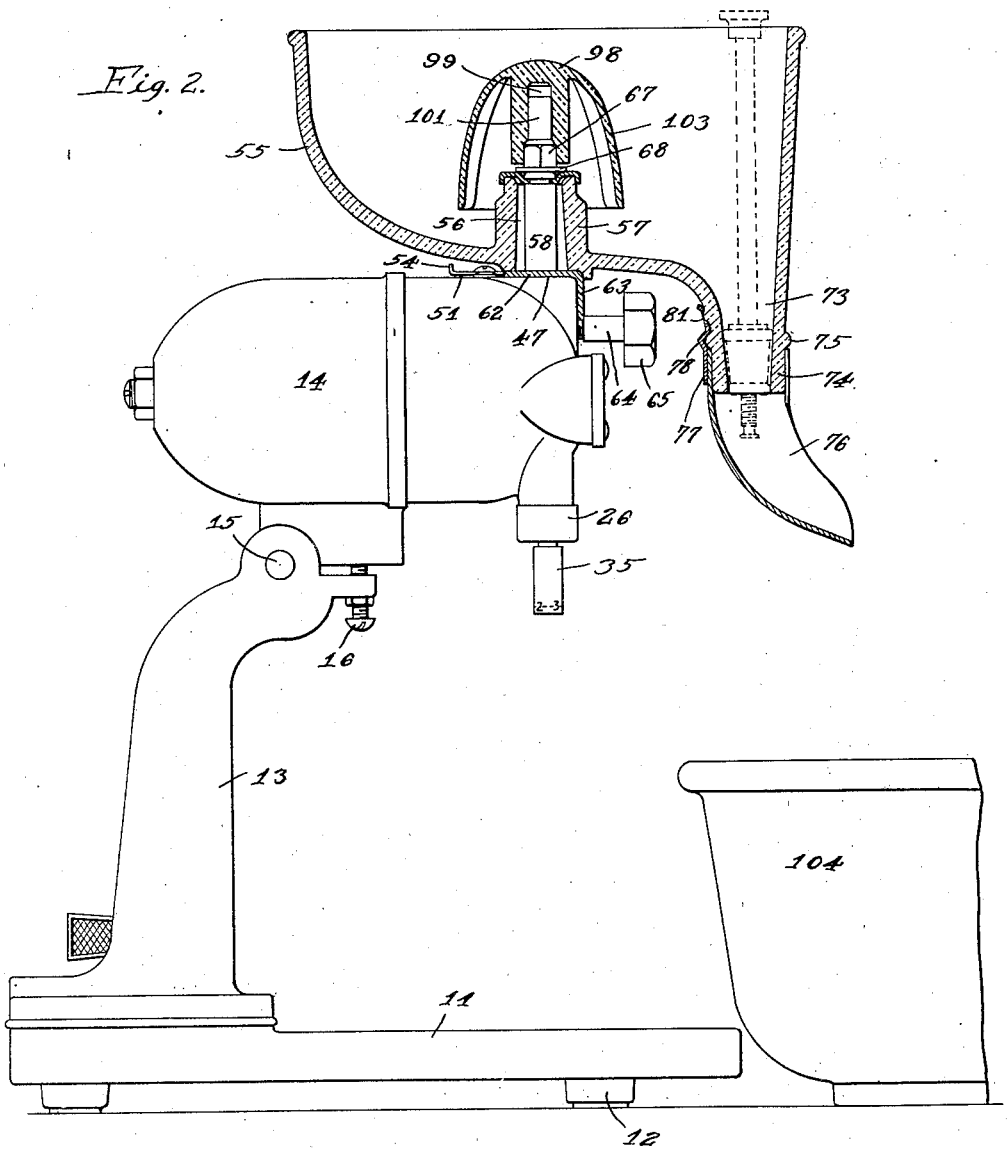

May 21, 1935. H. M. A. STRAUSS 2,002,333
PORTABLE HOUSEHOLD MIXER AND JUICE EXTRACTOR
Filed Sept. 8, 1931 3 Sheets-Sheet 3
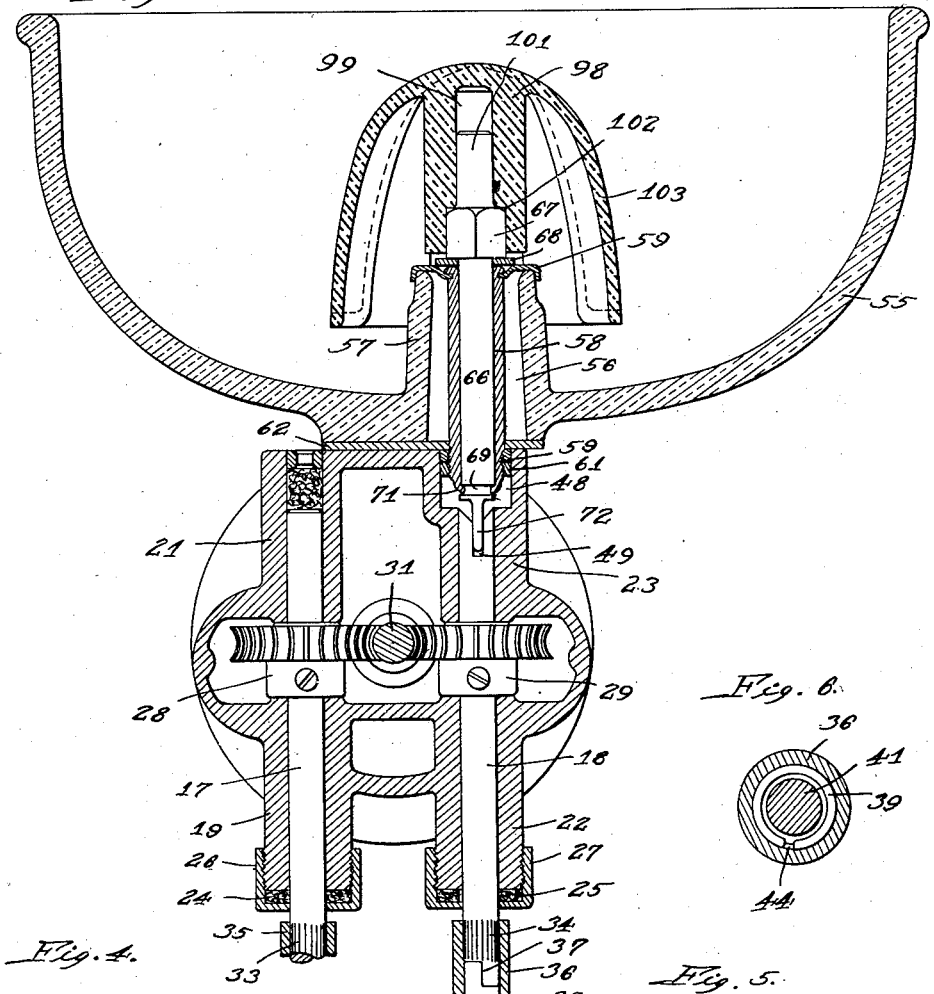
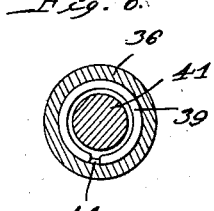
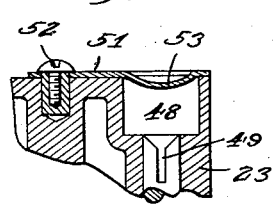
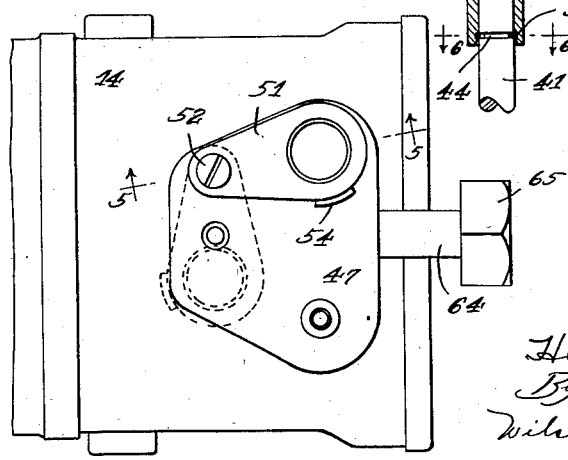
Inventor
Hermann M. Alfred Strauss
By
Wilson, Dawell, McCanna & Helm
Attys.

Patented May 21, 1935

2,002,333

UNITED STATES PATENT OFFICE 2,002,333

PORTABLE HOUSEHOLD MIXER AND JUICE EXTRACTOR

Hermann M. Alfred Strauss, Western Springs, Ill., assignor to Chicago Flexible Shaft Company, Chicago, Ill., a corporation of Illinois Application September 8, 1931, Serial No. 561,578

9 Claims. (Cl. 259—84)

This invention relates to a combined beater and fruit juice extractor and has particular reference to a portable device of this character for general household use.

One of the objects of the invention is to provide a device of this kind having greater utility for household uses in that it provides for independent mixing, independent juicing, and simultaneous, as well as joint, mixing and juicing; and I have further aimed to provide a device of this kind consisting of few elements constructed and arranged in such new combinations as to permit of low cost of manufacture and to enable quick and convenient adaptability for the intended uses.

One of the objects of the invention is to provide a household device of general utility comprising a beater, a container, means for directing and controlling the flow of liquid from the container into the zone of action of the beater or to adjacent receptacles, and means in the container for removing the juices of various fruits, this means being driven from the motor of the beater.

Another object of the invention is to provide an extracting and feeding attachment for a beater.

I have also aimed to provide a juice extractor having improved flow regulating means wherein the rate and the direction of the flow of liquids from the extractor may be controlled.

A still further object of the invention is the provision of an extractor which is adapted for use in holding and delivering emulsifiable liquids into the zone of action of the beaters for emulsification.

Another object of the invention is to provide a device wherein the beater blades may be quickly and conveniently removed to facilitate the independent use of the extractor and to expedite the cleaning of the blades.

Other objects and attendant advantages will become apparent from the following description, the accompanying claims and the drawings in which—

Figure 1 is a side elevation partly in section showing the extraction cone removed and the spout positioned to deliver into the zone of action of the blades;

Fig. 2 is a side elevation partly in section showing the extraction cone in place and the spout positioned to deliver into a vessel placed adjacent to the device;

Fig. 3 is a section on the line 3—3 of Fig. 1;

Fig. 4 is a fragmentary top view of the motor casing showing the platform for receiving the extractor bowl and the movable plate for covering the casing opening;

Fig. 5 is a section on the line 5—5 of Fig. 4;

Fig. 6 is a section on the line 6—6 of Fig. 3;

Fig. 7 is a fragmentary section of the extractor bowl outlet with the discharge regulating valve in place, the valve being shown in the closed position; and Fig. 8 is a fragmentary view partly in section of the discharge valve, showing the valve partly open.

While numerous modifications of the present invention may be made, the one herein described and shown consists in a general way of a base having an upright arranged to pivotally support a horizontally positioned motor adapted to be rotated to an upwardly tilted position. At least one beater shaft drive spindle is positioned in the casing of the motor at right angles to the motor shaft arranged to depend into an agitation vessel positioned on the base. A container and extractor bowl is removably secured to the upper side of the motor and is provided with an extraction member arranged to be driven by the motor and a valve outlet arranged to permit the regulation of both the rate and the direction of flow of liquid discharged from the bowl.

Referring to the drawings the device herein shown consists of a base 11 having legs 12 and an upright 13 arranged to support a motor casing 14. A pivotal connection 15 is provided between the motor and the upright 13 to permit the motor to be rotated between the horizontal position shown in the drawings and an upwardly tilted position. A regulating screw 16 is provided for adjusting the horizontal position of the motor. Spaced drive spindles 17 and 18 are rotatably positioned in horizontally and vertically spaced bearings 19, 21, 22 and 23, formed in the walls of the motor casing 14. Packing rings 24 and 25 surround the spindles 17 and 18 at the lower end of the bearings 19 and 22 and are secured in place by means of caps 26 and 27. Worm gears 28 and 29 are simultaneously driven by a worm 31 formed on the outer end of a motor shaft 32. It will be noted that the vertical drive spindles 17 and 18 are mounted in suitable bearings in a casing which also houses the gearing by which the spindles are driven from the horizontal drive shaft 32, and that this casing is in effect extended from one end of the motor casing or housing. The motor, gearing and casing provide a compact drive assembly for both the beater and the juice extractor, as will be presently described. The gear casing also serves to support an open top juice extractor bowl in close relationship to the mixing bowl and at the same time permits tilting of the casing while in operation to raise and lower the beaters, or to withdraw the beaters from the mixing bowl when the mixing operation is completed, or for changing the beaters.

The lower end of the spindles 17 and 18 are serrated as shown at 33 and 34 to fixedly secure sleeves 35 and 36 to the spindle. The lower end of each of the spindles 17 and 18 is also slotted as shown at 37, in a manner such that one-half the area of the end thereof is cut away for a short distance. Each of the sleeves 35 and 36 is provided with a groove 38 within which is positioned a split spring ring 39 of slightly smaller diameter than the inside diameter of the sleeve. Beater shafts 41 and 42 each having beater blades 43 are receivable in the sleeves 35 and 36, the upper end of each of the shafts 41 and 42 being provided with slots complementary to those in the spindles 17 and 18 so as to produce a driving connection as shown in Fig. 3. Each of the beater shafts 41 and 42 is provided with an annular slot 44 adapted to receive the split spring ring 39 when the beater shafts are moved into their operative positions, and to permit the removal of the beater shafts from the sleeves 35 and 36 by the exertion of a downward force on the beater shafts. This arrangement permits the beater shafts to be readily and quickly removed from the remainder of the beater for cleaning. Numerals or other indicia may be placed on the outer surfaces of the sleeves 35 and 36 and the beater shafts 41 and 42 to indicate the angular position of insertion.

Referring now more particularly to Fig. 1, a table 45 is rotatably positioned upon the base 11 to support a mixing bowl 46 of desired shape and size in a position to receive the beater blades 43 and to permit the motor casing 14 to be rotated between its tilted and horizontal positions with the beater blades 43 attached.

The mounting for the mixing bowl and the relation of the beater blades to the bowl form the subject matter of Patent No. 1,926,910, granted September 12, 1933, for household mixer.

In order to support the extraction and discharge mechanism, presently to be described, upon the motor casing 14, I have provided a flat portion 47 on the motor casing directly above the bearings 21 and 23 and have provided an enlarged opening 48 in the upper end of the bearing 23 to receive the driven shaft of the extraction mechanism as will presently be more fully described. The upper end of the drive spindle 18 is provided with a slot 49 for the purpose of transmitting rotation to the extractor shaft. A plate 51 is pivotally secured to the motor casing 14 by means of a screw 52 and is provided with a depressed portion 53, best shown in Fig. 5, and an upwardly extending projection 54, the depression 53 serving to maintain the plate in a position to close the opening 48 and the projection 54 providing means for manually moving the plate 51 from the full line position shown in Fig. 4, to the dotted line position shown therein to uncover the opening 48. The plate 51 prevents the entrance of water or other extraneous material into the opening 28 and thence to the bearing 23 when the extracting mechanism is removed.

A bowl 55 of glass, porcelain, or other desired material, having the general shape characteristics shown in the drawings is provided with an opening 56 in the bottom thereof having an upstanding flange 57 projecting well up into the interior of the bowl. A bearing sleeve 58 is positioned within the opening 56 and is provided at its upper end with a flange 59 arranged to fit over the top of the flange 57. The lower end of the sleeve 58 is threaded as shown at 59 to receive a nut and lock nut 61. A plate 62 best shown in Figs. 1 and 2, surrounds the sleeve 58 and is drawn upward against the lower end of the bowl 55 by the nuts 61, so as to rigidly hold the bearing sleeve 58 within the opening 59. The forward edge of the plate 62 is bent downward as shown at 63 to bear against the front side of the motor casing 14 and is provided with a vertical slot for receiving a thumb screw 64 for clamping the part 63 of the plate 62 against the casing 14. The thumb screw 64 is provided with an enlarged head 65 for convenient hand operation.

An extractor shaft 66 is rotatably positioned within the sleeve 58 and is provided at a point spaced from its upper end with a squared head 67. A washer 68 is interposed between the head 67 and the upper end of the sleeve 58. The lower end of the shaft 66 is provided with a circumferential groove 69 arranged to receive the inwardly bent lower end 71 of the sleeve 58 to prevent longitudinal movement of the shaft within the sleeve. A tongue 72 is formed on the lower end of the shaft 66 and is receivable in the groove 49 of the drive spindle 18, the tongue and groove 72 and 49 forming a driving connection between said spindle 18 and the shaft 66.

The bowl 55 is also provided with a downwardly extending outlet 73 along the forward wall of the bowl, the outlet having a neck 74 provided with a circumferential ring 75 preferably formed on the outer surface of the neck. A spout 76, best shown in Figs. 1 and 2, is rotatably supported on the outer surface of the neck 74 and is formed to discharge liquid passing downward from the outlet at an angle of about 45°. A spring latch 77 is provided with a portion 78 arranged to rest over the ring 75 to rotatably support the spout 76 upon the neck 74. The latch is further provided with an opening 79 arranged to receive a semi-circular projection 81 on the neck to normally maintain the spout 76 in the position shown in Fig. 2. It will be seen that when the spout occupies the position shown in Fig. 1 material flowing from the bowl 55 will be directed to a point within the zone of action of the beater blades 43 as shown in Fig. 1. On the other hand, when the spout occupies the position shown in Fig. 2 the material will be directed to a point beyond the zone of action of the beater blades 43.

Referring now to Figs. 1, 7 and 8, valve means are provided for regulating the flow of liquid from the bowl 55. This consists of a plug formed of a central sleeve-like metallic core 82 having flanged ends 83 and 84, a washer 85 above the flanged end 84 and a rubber or other resilient portion 86 surrounding the sleeve 82. The rubber portion 86 may advantageously be provided with outwardly projecting annular portions 87 and 88 to cause the plug to closely fit the inner walls of the outlet 73 and to permit the easy removal of the plug from the outlet. A valve stem 89 is provided with a threaded lower end 91 cooperable with the threaded inner surface of the sleeve 82 whereby rotation of the stem 89 will cause the same to be moved upward or downward through the plug. The lower portion of the stem 89 is provided with a central bore 92 and with openings 93 and 94 extending from the outer surface of the stem 89 radially into the bore 92, the openings 93 and 94 being longitudinally spaced in the rod. The stem 89 is provided with a shoulder 95 arranged to come into contact with the upper end of the sleeve 82 when the stem is advanced to its lowermost position to completely prevent the passage of liquid into the bore 92. It will be seen, however, that as the stem 89 is rotated in the opposite direction it will be moved upward from the position shown in Fig. 7 through the position shown in Fig. 8. As this retraction proceeds the openings 93 and 94 will progressively move beyond the end of the sleeve 82 so that increasing amounts of liquid will be permitted to pass from the interior of the bowl 55 through the openings 93 and 94 and the bore 92 into the spout 76 from which it will be discharged in a direction dependent upon the position of the spout. The lower end of the stem is flared as shown at 96 to prevent the stem from being completely removed from the plug and a knurled head 97 is provided on the upper end of the stem 89 for convenient manual actuation thereof. The knurled head 97 also permits the valve mechanism to be quickly and completely removed entirely from the outlet 73 to leave the outlet completely open so that liquid may flow from the bowl 55 as soon as it is deposited therein.

Referring now more particularly to Figs. 2 and 3, an extractor cone 98 is provided with a central cylindrical opening 99 to receive the upper end 101 of the extractor shaft 66 and with a hexagonal portion 102 to receive the head 67 of the shaft 66, rotation being imparted from the shaft 66 to the extractor cone 98 through the hexagonal head 67 and hexaginal opening 102. The extractor cone 98 may be formed of metal, glass, or any other suitable or desired material and is preferably provided with ribs 103 arranged to exert a boring action upon the interior of citrous fruits and the like for the purpose of crushing the tissue and extracting the juice therefrom. It will be seen that through this construction the interior of the bowl is very readily cleaned since the cone 98 may be lifted directly from the driving shaft 66.

It will be seen that the present device is designed and constructed to be capable of a plurality of common household uses without the necessity of duplication of parts. For example, in the condition shown in Fig. 2 the device is arranged for the extraction of fruit juices. If the valve mechanism, shown in dotted lines in this figure is omitted, the fruit juices will flow directly into the receiver 104. On the other hand if the valve mechanism is inserted in the outlet the fruit juices will be held in the bowl until their discharge is accomplished by manipulation of the valve.

The provision of the upstanding flange 57, and the fact that the extraction cone 98 is positioned at a point spaced from the bottom of the bowl permits of the accumulation of the fruit juices in the bottom of the bowl without interfering with the extraction process whereby the juice may be held within the bowl until it is desired. Furthermore, the bearing contact between the head 67 of the extractor shaft and the washer 68 is elevated sufficiently from the bottom of the extractor bowl to prevent contact of the fruit juice with the bearing surfaces and the resultant contamination of the juice or corrosion of the bearing.

Referring to Figure 1, the parts are shown in the position for feeding fluid from the extractor bowl 55 into the mixing bowl 46, so that it will be delivered into the zone of action of the beater blades 43. For example, in the manufacture of mayonnaise, oil may be placed in the bowl 55 and dispensed drop by drop into the vessel 46. Through rotation of the valve stem 89 the rate of flow of the oil may be regulated to suit the desires of the operator. In this function of the mechanism the extraction cone 98 may advantageously be removed from the bowl. However, in certain functions of the device it is desired to extract the juice from fruit and simultaneously direct the juice into the zone of action of the beater blade at a desired rate of flow. In this case, the extractor cone will be positioned within the bowl and the valve mechanism will be employed to regulate the rate of flow, the spout 76 being suitably positioned to direct the flow of the liquid.

It will be seen that I have provided an improved household device operable to simultaneously beat material, extract fruit juices and control both the rate of flow and the direction of flow of the fruit juices either into the zone of action of the beater blades or to a second receiver. The device is also operative to slowly feed a liquid material into the zone of action of the beater blades for the purpose of emulsification and the like.

While I have thus described and illustrated a specific embodiment of my invention, I am aware that numerous alterations and changes may be made therein, without departing from the spirit of the invention or the scope of the appended claims, in which—

I claim:

1. A household mixer and juice extractor having a motor and reduction gearing assembly, a vertical drive spindle permanently mounted in said assembly and driven by said reduction gearing, a beater shaft coaxial beneath and an extractor shaft coaxial above said drive spindle, each of said shafts having detachable engagement with said drive spindle, a juice extractor bowl having a central upstanding flange on its base provided with a vertical opening through which the extractor cone shaft extends, a plate interposed between the extractor bowl and said assembly attached to the extractor bowl and serving to locate the extractor bowl with respect to said assembly, and means providing detachable engagement between said plate and said assembly serving to prevent accidental displacement of the extractor bowl from its operative position.

2. A portable household mixer and juice extractor comprising a base, a mixing bowl supported on the base, a horizontal motor mounted on the base and having a gear casing at one end overreaching the mixing bowl, a pair of vertical drive spindles journaled in said casing and driven from the motor through reduction gearing, a beater shaft coaxial beneath each drive spindle and an extractor shaft coaxial above one of said drive spindles, each of said shafts having detachable driving engagement with its respective drive spindle, each beater shaft having a beater at its lower end and the extractor shaft having a juice extractor cone at its upper end, a juice extractor bowl mounted on top of said gear casing concentric with said juice extractor cone and having a spout discharging into said mixing bowl, said drive spindles serving to drive said beater shafts and said extractor shaft for independent mixing, independent juicing, and simultaneous as well as joint mixing and juicing according to the engagement of said driving connections, and means whereby the horizontal motor, gear casing, juice extractor and beaters may swing vertically as a unit upon and with respect to the base to raise and lower the beaters in the mixing bowl and to move the beaters into and out of the mixing bowl without interrupting the cooperative relationship between the elements of said unit.

3. A household mixer and juice extractor comprising a base, a mixing bowl on the base, a support on said base in a position above and overreaching the mixing bowl, beater and extractor driving means on said support, a beater in said mixing bowl driven by said driving means, an extractor bowl mounted upon said support, a juice extractor cone within said extractor bowl driven by said driving means, said extractor bowl having a depending vertical neck open at its lower end and located at one side of and in proximity to said support to discharge downwardly directly into said mixing bowl, said neck being shaped to provide spout retaining means, and a spout shaped to fit onto the lower end of said neck in removable engagement with said retaining means and having a downwardly and laterally directed discharge end, the spout being rotatable upon and about said neck for discharging juice inside and outside of the area of said mixing bowl according to the setting of the spout.

4. A household mixer and juice extractor having a support mounted above a mixing bowl, said support having drive mechanism for driving a beater in operative position in the bowl, an extractor bowl mounted on top of said support, a juice extractor cone within said bowl driven by said mechanism, the bottom of said extractor bowl having a vertical, annular neck open at its lower end providing a discharge throat, and a spout fitting said annular neck and rotatable about the vertical axis thereof, said spout having a downwardly and laterally inclined discharge end shaped to discharge juice into the open top of said mixing bowl while the latter is in said mixing position, said spout being rotatable for discharging juice outside of the area of said bowl, the angle of said inclined discharge end being unchanged when rotated about the vertical axis of said neck.

5. A household mixer and juice extractor having a base, a mixing bowl on the base, a support mounted on the base in position above said bowl, driving mechanism in said support, a beater in said mixing bowl driven by said mechanism, an extractor bowl mounted on top of said support, an extractor cone in said extractor bowl driven by said mechanism, the extractor bowl having a vertical bottom outlet in the form of a depending neck arranged to discharge directly into said mixing bowl and shaped to provide spout retaining means, and a discharge spout shaped to removably engage said retaining means, said spout being mounted on said neck to swing back and forth thereon from one position to another to discharge juice inside and outside of the area of said mixing bowl according to the setting of the spout on the neck.

6. A household mixer and juice extractor having a motor driven beater unit supported above a mixing bowl and having a beater extending downwardly into said bowl, a juice extractor bowl mounted on top of said unit, a juice extractor cone in said extractor bowl driven by said motor, said extractor bowl having a central hub portion for attachment to said unit, the side wall and bottom of the extractor bowl merging into a vertical, annular throat open at its lower end and positioned to discharge directly into said mixing bowl, and a spout fitting said neck and supported thereon, the spout being adapted for rotative movement about the vertical axis of said throat and having a downwardly and laterally inclined discharge opening at its lower end whereby to discharge juice beyond the area of said mixing bowl, the angle of said discharge end being unchanged when rotated about the vertical axis of said neck.

7. A portable household mixer and juice extractor comprising a base, a mixing bowl supported on the base, an open top juice extractor bowl located directly above the mixing bowl and having a spout discharging directly into the same, a horizontal motor and drive gearing assembly in a unit interposed between the mixing bowl and the juice extracting bowl with the motor and the drive gearing at opposite ends, the drive gearing end of the unit overhanging the mixing bowl, the extractor bowl being mounted on top of the drive gearing end of the unit, means supporting said unit on the base with capacity to swing about a horizontal pivot axis disposed at one side of the mixing bowl, a pair of coacting beaters in the mixing bowl, a juice extractor in the extractor bowl, said beaters and juice extractor being driven by said gearing, the juice extractor and beaters being supported in cooperative relationship on said unit and maintained in said relationship when the unit is swung on its pivot to raise and lower the beaters and to move the beaters into and out of the mixing bowl.

8. A portable household mixer and juice extractor comprising a base, a mixing bowl supported on the base, an open top juice extractor bowl located directly above the mixing bowl and having a depending spout discharging into the same, a horizontal motor and gearing assembly in a unit interposed between the mixing bowl and the juice extractor bowl, the gearing being driven by the motor and arranged at the front end of the unit, means supporting the juice extractor bowl on top of said unit at the gearing end thereof, a pair of vertical drive spindles journaled in the gearing end of said unit and driven by said gearing, coacting beater elements in the mixing bowl driven from said drive spindles, a juice extractor cone in the extractor bowl, a vertical extractor cone shaft driven from said gearing, and means supporting said motor and gearing unit on the base to tilt about a horizontal axis, whereby said unit together with the juice extractor and beaters are movable about said axis to raise and lower the beaters and to withdraw the beaters from the mixing bowl, and whereby the juice extractor is maintained in cooperative relation with the beaters.

9. A portable household mixer and juice extractor comprising a base having a bowl-supporting end and a motor-supporting end, a mixing bowl on said bowl-supporting end, an electric motor on said motor-supporting end, an open top juice extractor bowl positioned directly above the mixer bowl in comparatively close relation thereto and having a depending spout discharging directly into the mixing bowl, a gear casing interposed between the mixing bowl and the juice extractor bowl supported in such position from the motor-supporting end of the base and in turn serving to support the juice extractor bowl, a horizontal drive shaft journaled in said casing and driven by said electric motor, a pair of vertical drive spindles journaled in said casing, gearing in said casing between said horizontal drive shaft and said vertical drive spindles, a pair of coacting beater elements in the mixing bowl driven by said spindles, a juice extractor cone in the juice extractor bowl, and a vertical extractor cone drive shaft having driving connection with said gearing, whereby said juicing and mixing devices coact by their joint operation, said support for the gear casing having means whereby the casing may be swung vertically to carry the beaters into and out of the mixing bowl, the casing serving to carry the juice extractor and the beaters in cooperative relation when swung from one such position to another.

HERMANN M. ALFRED STRAUSS.